Patented Sept. 17, 1946

2,407,624

UNITED STATES PATENT OFFICE 2,407,624

AQUEOUS SOLUTION OF RIBOFLAVIN

John Cecil Bird, Pleasantville, and Andrew Kuna, Douglaston, N. Y., assignors, by mesne assignments, to The William S. Merrell Company, Cincinnati, Ohio, a corporation of Delaware No Drawing. Application May 9, 1944, Serial No. 534,826

2 Claims. (Cl. 167—81)

This invention relates to improvements in vitamin compositions and more particularly to the solubilizing of vitamin G (riboflavin) and compositions containing it as well as multi-vitamin products.

The vitamin compositions of the present invention contain riboflavin or vitamin G solubilized with gallic acid (3.4.5-trihydroxybenzoic acid) and more particularly with water soluble alkali metal salts of gallic acid.

Riboflavin is one of the least soluble of the water soluble series of vitamins which include $B_1$, G, C, pantothenic acid, niacin, niacin amide and other factors of the B complex. Its solubility in water at room temperature is only about 15 to 17 mg. per 100 cc. Its solubility in organic solvents such as glycerin, alcohol, glycol, etc., is even less and this limited solubility is frequently a deterrent to the preparation of well proportioned, concentrated, multi-vitamin liquid products. The limited solubility of riboflavin has prevented the obtaining of a sufficiently high dose of riboflavin in admixture with other more soluble vitamins in the liquid volume specified for use; and, if a greater volume of the same liquid is used, higher dosages of the other more soluble vitamins may result.

It has been proposed to promote the solubility of riboflavin by certain nitrogenous "amino compounds" such as urea and various amides, but the resulting solutions have certain objectionable features such as the tendency to decompose gradually, forming ammonia, which slowly renders the accompanying riboflavin alkaline and biologically impotent. Thus ampoules of riboflavin solutions for injection made with urea as an accessory solvent deteriorate in potency after several months, the originally yellow liquid becoming colorless and useless.

The present invention is based upon the discovery that riboflavin or vitamin G can be solubilized by the use of a simple organic chemical, readily prepared, easily available and low in cost, namely, gallic acid, and more particularly by the use of its water soluble salts of sodium, potassium and lithium.

The free gallic acid is not sufficiently soluble in water to give the desired solubilizing effect, but when used in aqueous alcohol, such as a mixture of water and ethyl alcohol in equal proportions, gallic acid is an effective solubilizing agent and enables the riboflavin to be dissolved in sufficient amounts to give relatively concentrated solutions well adapted for use in making concentrated multi-vitamin products.

The water soluble alkali metal salts of gallic acid are particularly advantageous for solubilizing riboflavin in water solution. Thus, the addition of sodium gallate to suspensions of riboflavin in water causes immediate solution of the riboflavin, giving clear, homogeneous yellow liquids in which the other water soluble vitamins may be incorporated to give the desirable strengths and proportionate amounts for the preparation of multi-vitamin, liquid "drop" concentrates.

Thus, using an aqueous alcohol solvent containing equal parts of water and ethyl alcohol, a 10% solution of gallic acid was found to dissolve about 14 milligrams of riboflavin in 10 cc. of solution. A 10% solution of the sodium salt of gallic acid made by adding the gallic acid to water and by adding sodium hydroxide to give a pH of 6.7 dissolved about 58 milligrams of riboflavin at 24.5° C. in 10 cc. of solution, while a similar solution of the potassium salt of gallic acid dissolved about 73 milligrams of riboflavin and a similar solution of the lithium salt about 60 milligrams of riboflavin. Increased amounts of riboflavin can be dissolved by using increased amounts of the salts.

The aqueous solutions of riboflavin solubilized with the alkali metal salts of gallic acid can be made containing relatively concentrated solutions of riboflavin and these are advantageously used for injection, making possible the injection of the requisite dose in a limited amount of liquid.

Dry compositions can advantageously be prepared by admixing riboflavin with the alkali metal salts of gallic acid in proportions such that the resulting mixture when added to distilled water will readily dissolve. So also, dry compositions can advantageously be prepared by first forming the solution of the riboflavin in aqueous solution with the alkali metal salt of gallic acid and evaporating the resulting solution in vacuo to produce a solid product which can be readily redissolved in distilled water. Such dried products can be made and marketed and used when desired by dissolving in water to form relatively concentrated solutions of riboflavin suitable for use, e. g., for injection, etc.

The solutions of riboflavin thus produced as above described can advantageously be used by adding thereto other water soluble vitamins, the solubility of which is not adversely affected by the presence of the water soluble salts of gallic acid.

Such solutions have the further advantage that they can be compounded with solutions of vitamin A and vitamin D in suitable solvents therefor such as sorbitol monolaurate, etc. to give composite, clear solutions containing the full balanced requirements of all the essential vitamins. Thus, the more concentrated solutions of riboflavin produced according to the present invention render possible the production of clear, homogeneous, multi-vitamin liquid products adapted, for example, to the use of infants and young children. These composite multi-vitamin solutions may be prepared and packaged and sold in small containers containing, e. g., one ounce or more of the vitamin composition and provided with dropping pipettes such that a few drops added to milk, fruit or tomato juice, etc. will furnish the full daily requirements of all the essential vitamins.

Multi-vitamin solutions can also be prepared well adapted for administering the vitamins by injection.

The invention will be further illustrated by the following examples, but it will be understood that the invention is not limited thereto.

*Example I.*—A saturated solution of the sodium salt of gallic acid is prepared by adding the gallic acid to water and by adding sodium hydroxide to a pH of 6.8 and this solution is evaporated to dryness at reduced pressure. A dry preparation is made by mixing and grinding together the sodium gallate with riboflavin in the proportions of 1 kilogram of sodium gallate to 55 grams of riboflavin. The resulting dry preparation can be used, e. g., in ampoules each containing 1.055 grams of the composition, which when dissolved in 10 cc. of distilled water will give a solution containing 55 milligrams of riboflavin.

*Example II.*—A 10% solution of the sodium salt of gallic acid is made by suspending 1 kilogram of gallic acid in 6 liters of water, adding sodium hydroxide to a pH of 6.8, and adding water to give a volume of 10 liters. To this solution of the sodium gallate are added 55 grams of riboflavin which dissolves in the solution. The resulting solution is then concentrated to dryness at reduced pressure and the dried product is then ground to powder form and can be placed in ampoules, e. g., so that each ampoule will contain an amount of the composition such that when dissolved in 10 cc. of distilled water the solution will contain 55 milligrams of riboflavin.

Instead of using the sodium salt of gallic acid in making the dry compositions of Examples I and II the potassium or the lithium salt can be used. The dry compositions can be marketed as such, e. g., in ampoule form or may be used in forming solutions by redissolving in water.

*Example III.*—A 15% solution of the sodium salt of gallic acid is prepared by adding the gallic acid to water and by adding sodium hydroxide to a pH of 6.8. To 10 liters of this solution there are added 40 grams of riboflavin which readily dissolves. There are also added 20 grams of thiamin, 200 grams of niacin amide, 600 grams of ascorbic acid and 6 liters of glycerin.

A separate solution is prepared of vitamins A and D in a solvent therefor, for example, by using 5 liters of sorbitol monolaurate ethylene oxide polymer (Tween 20) as a solvent and dissolving therein with moderate heating sufficient vitamin A and D concentrates to give 50,000,000 U. S. P. units of A and 5,000,000 U. S. P. units of D.

The solution thus prepared is added to the former solution and a stream of gas such as nitrogen or carbon dioxide is passed through the liquid. The resulting agitation causes complete solution of all solid constituents and produces a clear, homogeneous, yellow liquid of high vitamin potency. The passage of the inert gas protects the product from auto-oxidation during the process.

*Example IV.*—A 15% solution of the potassium salt of gallic acid is prepared by adding the gallic acid to water and neutralizing with potassium hydroxide to a pH of 6.8 and the water soluble vitamins are added thereto as in Example III except that two liters of propylene glycol are used instead of 6 liters of glycerin. The vitamins A and D are separately dissolved in 8 liters of sorbitol monolaurate ethylene oxide polymer (Tween 20) and this solution is admixed with 10 liters of solution containing the potassium gallate and the water soluble vitamins and the solutions are agitated with an inert gas as described in Example III.

*Example V.*—A 20% solution of the sodium salt of gallic acid is prepared as in Example III by neutralizing the gallic acid with sodium hydroxide to a pH of 6.8. 8 liters of this solution are used as in Example III but instead of 5 liters of glycerin there are used 5 liters of a 75% dextrose syrup containing 50 grams of citric acid and 25 grams of monobasic potassium phosphate. The vitamins A and D are added dissolved in 7 liters of sorbitol monolaurate ethylene oxide polymer (Tween 20).

*Example VI.*—A solution of potassium gallate is made by adding 1 kilogram of gallic acid to water sufficient to make 7 liters and by adding potassium hydroxide to a pH of 6.0. To this solution are added 50 grams of riboflavin, 50 grams of thiamin, 440 grams of niacin amide and 880 grams of ascorbic acid. A solution is made in 7 liters of sorbitol monolaurate ethylene oxide polymer (Tween 20), together with 2 liters of glycerin and 4 liters of concentrated sorbitol syrup. The two solutions are mixed as described in Example III.

The procedures described in the above examples have the advantage that they may be carried out without heating to high temperatures. The final pH of the products is about 6.2 to 6.3.

It will be noted that the finished products are on the acid side which is important from the standpoint of retention of riboflavin potency. Moreover, the solubilizing compound or accessory substance is not of the type of those referred to above which contain nitrogen or an amino group and which tend to decompose gradually forming ammonia and slowly rendering the riboflavin alkaline and biologically inert, and is non-basic in character and does not tend to produce an alkaline reaction over a period of time.

It is an advantage of the present invention that solutions of multi-vitamin products can be prepared in the cold or with only moderate heating and with almost instantaneous solution, thus avoiding heating to high temperatures or exposure to light for prolonged periods of time.

When gallic acid is used as a solubilizing agent instead of its water soluble alkali salts, by dissolving the gallic acid in aqueous alcohol, the procedure is similar to that above described; but the use of the water soluble alkali salts has the advantage that the entire process can be carried out in aqueous solution and with production of a product of regulated acidity.

The following example illustrates the use of gallic acid as the solubilizing agent:

*Example VII.*—A 20% solution is made of gallic acid in 5 liters of aqueous alcohol containing 2 liters of ethyl alcohol and 3 liters of water and to this solution are added 20 grams of riboflavin, 10 grams of thiamin, 100 grams of niacin amide, and 300 grams of ascorbic acid. A separate solution is made of 5 liters of sorbitol monolaurate ethylene oxide polymer (Tween 20) containing 50,000,000 units of vitamin A and 5,000,000 units of vitamin D. The solutions are mixed and blended as described in the preceding examples.

It may be that the gallic acid or its water soluble salts, in exerting their solubilizing action on the riboflavin form combinations, physical or chemical, therewith. But whatever the explanation may be, the riboflavin is readily dissolved to form concentrated and stable solutions well adapted for use as vitamin solutions or in forming multi-vitamin solutions. Concentrated solutions of riboflavin can thus be prepared for making ampoules for injection as well as for preparing vitamin compositions for use orally or for addition to milk or other food products.

The amount of gallic acid and of its water soluble salts used in solubilizing riboflavin can be varied depending upon the concentration desired in the resulting solution. In general, solutions of around 6 to 8% of gallic acid and its water soluble salts will dissolve an amount of riboflavin suitable for producing multi-vitamin drop concentrates such, for example, that the concentrate will contain the minimum daily requirements for an adult of all six essential vitamins in 1 cc. of liquid. By increasing the percent of gallic acid or of its water soluble salts to 10 or even 20% it is possible to prepare a concentrate of the six vitamins such that the full minimum daily requirements for an adult are contained in about ½ cc. of liquid, that is, in about 10 to 12 drops.

It will thus be seen that the present invention provides improved vitamin compositions of high riboflavin content in the form of homogeneous, clear, slightly acid solutions or in the form of dry products and that multi-vitamin liquid preparations can be readily prepared therewith containing all of the essential vitamins in suitable and balanced proportions to meet the full daily requirements.

We claim:

1. An aqueous solution of riboflavin having a concentration of riboflavin higher than that obtainable in water alone and containing a water-soluble alkali metal salt of gallic acid in an amount sufficient to substantially increase the solubility of the riboflavin in said aqueous solution.

2. A dry vitamin composition containing riboflavin and a water-soluble alkali metal salt of gallic acid in an amount sufficient to substantially increase the solubility of the riboflavin in water whereby the resulting aqueous solution has a concentration of riboflavin higher than that obtainable in water alone.

JOHN CECIL BIRD.
ANDREW KUNA.